Aug. 29, 1961     J. HUEBLER     2,998,303
METHOD FOR PURIFYING HYDROGEN CONTAMINATED WITH METHANE
Filed Aug. 26, 1958
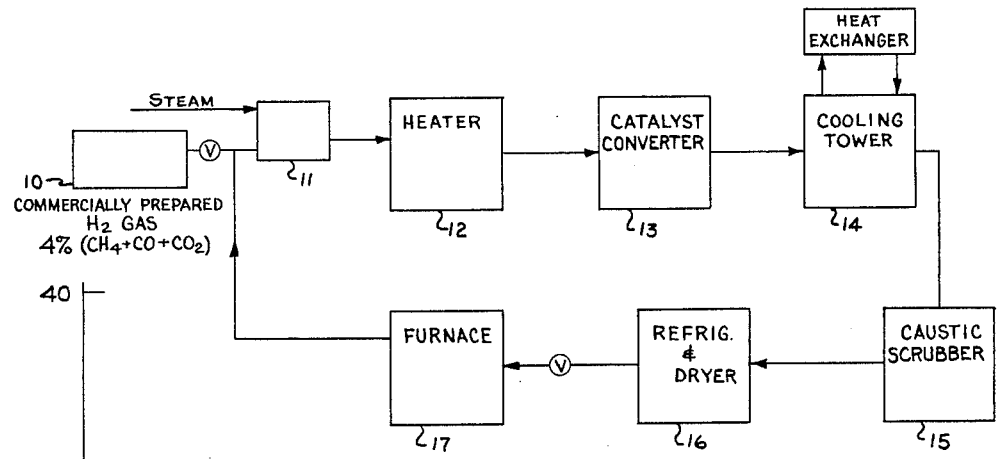
FIG. 1.
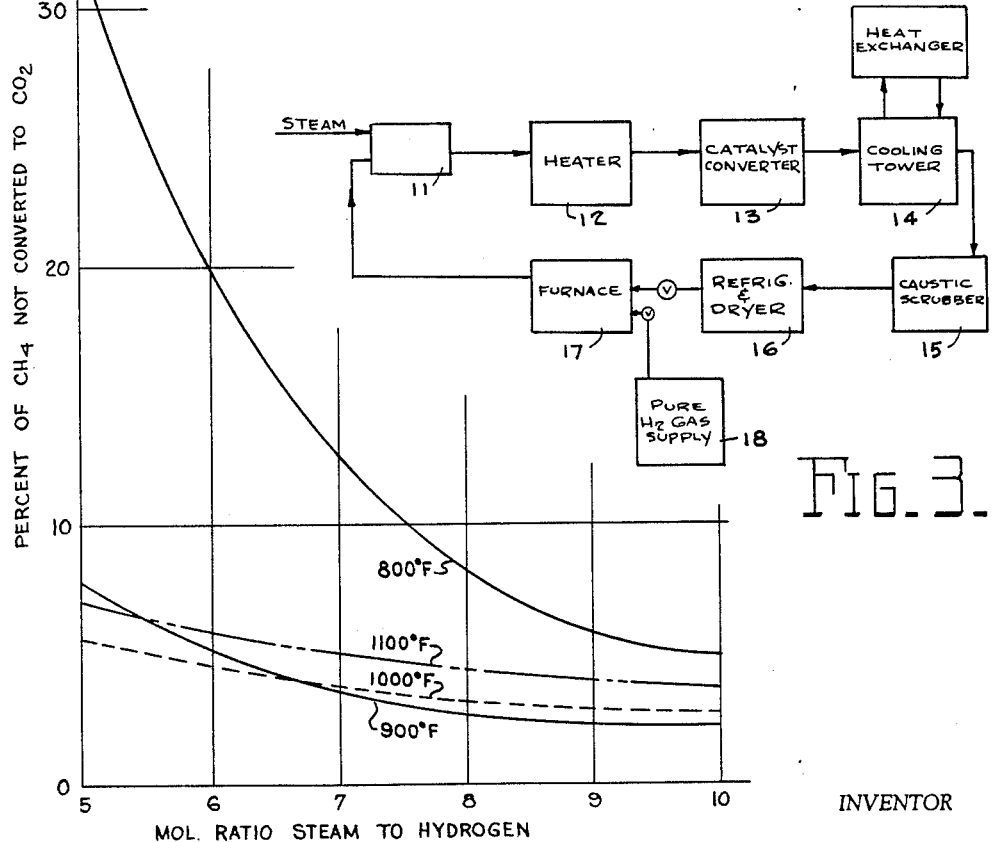
FIG. 2.
FIG. 3.
INVENTOR
JACK HUEBLER
BY Charles P. Haughey
ATTORNEY

United States Patent Office 2,998,303
Patented Aug. 29, 1961

2,998,303
METHOD FOR PURIFYING HYDROGEN CONTAMINATED WITH METHANE
Jack Huebler, Sylvania, Ohio, assignor, by mesne assignments, to Midland-Ross Corporation, Cleveland, Ohio, a corporation of Ohio
Filed Aug. 26, 1958, Ser. No. 757,402
3 Claims. (Cl. 23—212)

The present invention relates to improved apparatus and method for heat-treating metal in a decarburizing atmosphere. In one embodiment the invention relates to a method of heat-treating metal in an atmosphere of catalytically prepared hydrogen of a purity heretofor unattainable.

In another embodiment, the invention relates to a purification system for purifying a hydrogen atmosphere after circulating through the work chamber of a heat-treating furnace, and recirculating the purified atmosphere stream.

A sub-combination of the heat-treating apparatus and method relates to method and apparatus for removing minute quantities of methane from a hydrogen stream prepared from a gaseous hydrocarbon.

Superior results may be obtained in annealing processes of metals containing elements which form stable carbides, if the annealing atmosphere contains a substantial proportion of hydrogen and very minor quantities of carbon and oxygen bearing gases. Among such metals are preferred-orientation iron which contains silicon, and the stainless steels which contain chromium.

When entering the annealing process, such metals normally contain both carbon and oxygen within the metal and upon the surface. As the anneal progresses the carbon and oxygen can be withdrawn from the metal into the atmosphere only if the atmosphere contains less than the equilibrium quantities of gases such as $H_2O$, CO, $CO_2$ and $CH_4$. The rate of withdrawal of the carbon and oxygen will be proportional to the purity of the surrounding atmosphere with respect to these gases.

The optimum result will, therefore, be obtained when a flow of atmosphere of maximum purity is circulated through the furnace at a rate exceeding the rate of contamination of the atmosphere by the metal so as to provide an atmosphere of maximum purity in the vicinity of the metal. Generally, the desired rate of atmosphere flow will be much greater than the flow required to offset normal seal losses and thereby obtain a process advantage. Furthermore, an economic advantage may be obtained if the supply of fresh pure atmosphere is minimized while maintaining the desired high flow rate by recirculating the atmosphere from the furnace, through a purification system for removal of contaminants and returning to the furnace at a high volume rate.

An object of the present invention is to provide means for heat-treating metal in a decarburizing atmosphere of hydrogen gas at a sufficient volume rate of circulation to insure that the atmosphere always contains less than the equilibrium quantity of methane.

Another object of the invention is to provide means for purifying a vented stream of hydrogen atmosphere and for recirculating such purified stream.

Still another object of the invention is to provide means for removing minute quantities of methane from a catalytically prepared hydrogen stream and thereby produce catalytic hydrogen of optimum purity.

A further object of the invention is to provide means for catalytically purifying a stream of hydrogen contaminated with less than 1% of contaminants including methane to the extent that the purified stream of hydrogen contains 0.1% or less of methane.

In accordance with this invention, a source of catalytic hydrogen is provided, preferably containing less than 1% contaminants on a dry basis. The contaminants may be in the form of methane, carbon monoxide, or carbon dioxide, or any combination of the three named gases. It will be understood that the hydrogen will also contain nitrogen, argon and other inert gases in tolerable amounts and therefore may be disregarded. While the present invention is particularly concerned with the removal of the methane contaminants, if carried out at the preferred temperature ranges and with the preferred mol ratio of steam to hydrogen, the simultaneous conversion and removal of the carbon monoxide is also promoted. In the contemplated process, the carbon monoxide contaminant poses no great problem because of the small quantity present and which is simultaneously converted at the time the methane is converted; however, if a source of contaminated hydrogen containing great quantities of carbon monoxide is provided, any of several well known processes may be inserted as an additional step in the system for the removal of such carbon monoxide.

The contaminated hydrogen is mixed with steam and the mixture heated in an indirect heater prior to being conducted through a catalyst bed which promotes the conversion of the methane to hydrogen and carbon dioxide. A secondary conversion may also take place in which some of the methane is converted to hydrogen and carbon monoxide. This secondary reaction is accompanied by another reaction in which the carbon monoxide in the presence of $H_2O$ is converted to carbon dioxide.

The reaction products from the catalyst bed are preferably conducted to a cooling tower where excess steam is condensed and removed, from whence they are passed at reduced temperature into contact with a monoethanolamine solution and/or a caustic solution for the removal of the carbon dioxide.

The hydrogen gas stream may then be dried by refrigerating and passing through a desiccant bed and subsequently conducted to the annealing furnace for circulation through the work at a preferred rate.

After contact with the work, during which time the hydrogen atmosphere has been contaminated with carbon and other impurities passing from the work, the atmosphere may be vented to the first stage of the purification system for subsequent recycling through the system. Thus after the initial cycle only enough fresh atmosphere need be added to compensate for any escape losses in the system or furnace.

The apparatus and method of my invention will be more readily understood by reference to the following detailed example and the accompanying drawing of which FIGURE 1 is a diagrammatic view illustrating a preferred form of the invention; FIGURE 2 is a graphical representation of the mol ratio of steam to hydrogen required to obtain a product containing various percentages of unconverted methane; FIGURE 3 is a diagrammatic view illustrating an alternative form of the invention which is suitable when the hydrogen supply is sufficiently uncontaminated so as not to require further purification.

With reference to FIGURE 1, a stream of catalytic hydrogen (preferably 99.6% $H_2$ with contaminants $CH_4$, $CO_2$ and CO) is delivered from a suitable source 10 at the rate of 3000 s.c.f.h. for mixing with 1300 lb./hr. (27,300 s.c.f.h.) of 200° F. steam at 11. The mol ratio of steam to hydrogen being at least 5 to 1, preferably about 9 to 1.

The mixture is preferably heated to a temperature in the range of 800° F. to 1000° F. in indirect heater 12 and passed to catalyst converter 13 where the methane contaminant is converted in accordance with the primary reaction:

$$CH_4 + 2H_2 = CO_2 + 4H_2$$

and a secondary reaction:

$$CH_4 + H_2O = CO + 3H_2$$

which is accompanied by another reaction:

$$CO + H_2O = CO_2 + H_2$$

The preferred catalyst has as its active ingredient .01% to 2.0% metal selected from the group consisting of ruthenium and rhodium; the balance of the catalyst is any material inert to the above reactions. With this preferred catalyst the mixture is preferably heated to a temperature in the range of 800° F. to 1000° F. In the past the above indicated reactions of hydrocarbons with steam have been usually carried out in the presence of a metal selected from the group consisting of iron, cobalt, nickel, chromium, manganese, and copper, with nickel being used most generally. By the use of the preferred catalysts, ruthenium or rhodium, conversion of methane to a degree heretofore unattainable may be accomplished. Reference to FIGURE 2 indicates that with a mol ratio of steam to hydrogen of 9 to 1 and a reaction temperature of 900° F., only 2½% of the methane will remain unconverted or less than .01% of the total volume of the hydrogen stream.

The resultant gaseous mixture from the converter 13 is circulated through condensate cooling tower 14 wherein the excess steam is condensed and temperature of the mixture is reduced to substantially 100° F. before being passed through a scrubber 15 to remove the $CO_2$ which was formed in the converter 13. The mixture may be scrubbed with a caustic solution or in monoethanolamine followed by caustic.

After removal of the $CO_2$ in the scrubber 15 the moisture in the mixture is completely removed by passing the mixture through a refrigerator 16 and an activated alumina bed. The essentially pure hydrogen (.01–.02% $CH_4$ and .003–.005% CO) is then conducted to the furnace chamber 17 for circulation about the work at a rate greater than that at which it is being contaminated with carbon from the work.

By way of example, if with a charge of 4 steel coils weighing 5 tons each and containing .003% C it is desired to eliminate half the carbon in 10 hours in the form of $CH_4$ or CO, hydrogen atmosphere in excess of 3780 s.c.f.h. would be circulated.

$$.5 \times .00003 \, C \times 4 \times \frac{10,000\#}{10 \, hr.} =$$

$$.06\# \, C/hr. = .005\# \, Mol \, C/hr.$$

$.005 \times 378 \, ft^3/\# \, Mol = 1.89$ s.c.f.h. of $CH_4$ and/or CO

If the percentage of $CH_4$ and/or CO is limited to .05% in the hydrogen stream then the average volume of atmosphere required is:

$$\frac{1.89 \, s.c.f.h.}{.0005} = 3780 \, s.c.f.h.$$

The excess volume of atmosphere circulation is preferably sufficient to compensate for any escape losses through doors, etc., in addition to the excess required to limit the formation of $CH_4$ and/or CO to the desired percentage.

After circulating in the furnace chamber, the hydrogen atmosphere contaminated with methane produced by reaction with carbon from the work is normally vented and lost. The present invention provides method and means for repurifying such vented atmosphere for recirculation through the furnace chamber. Since the contaminant in the atmosphere vented from the furnace chamber is essentially methane, the stream from the furnace chamber may be introduced for mixing with steam together with the necessary "make-up" fresh hydrogen at the beginning of the above described cycle. After the initial charge of purified hydrogen through the furnace chamber only enough fresh hydrogen need be added to the system to compensate for any escape losses in the system.

In reference to FIGURE 3 where the commercial hydrogen supply 18 is sufficiently uncontaminated so as not to require further purification or processing, fresh hydrogen may be introduced into the system at a point downstream of the catalyst converter 13, preferably at a point downstream of refrigerator 14 whenever practical.

It is to be understood that the foregoing detailed description and specific example is for the purpose of illustrating a preferred embodiment of the invention. Many modifications and variations may be made without departing from the spirit and scope thereof, therefore only such limitations should be imposed as indicated in the appending claims.

We claim:
1. A process for removing minute quantities of contaminants present in commercially prepared hydrogen which comprises mixing said hydrogen with steam at the rate of one mol of hydrogen with 9 mols of steam, heating the resultant mixture to about 900° F. in an indirect heater, passing the mixture through a conversion tower containing a catalyst whose active ingredient is metal selected from the group consisting of ruthenium and rhodium to convert the carbon content of the methane to carbon dioxide, removing the carbon dioxide from the hydrogen stream in a scrubbing operation, and drying the hydrogen stream by passing it through a desiccant tower.

2. The process of removing methane present in commercially prepared hydrogen gas which comprises reacting a mixture of said hydrogen gas and steam at a mol ratio of steam to hydrogen of at least 5 to 1 and at a temperature of about 900° F. in contact with a catalyst whose active ingredient is .01% to 2.0% of a metal selected from the group consisting of ruthenium and rhodium and until the carbon content of the methane is substantially converted to carbon dioxide.

3. The process of purifying a contaminated stream of hydrogen containing less than 1% of contaminants including methane to convert the carbon content of the methane to carbon dioxide to such an extent that the purified stream of hydrogen contains 0.1% or less of methane which includes the steps of: mixing said contaminated stream of hydrogen with steam at a mol ratio of steam to hydrogen of 5 to 1 or greater; heating the mixture of steam and contaminated hydrogen to a temperature in the range of 800° F. to 1000° F. in an indirect heater; subjecting the heated mixture to the catalytic action of a metal selected from the group consisting of ruthenium and rhodium; and cooling the mixture to condense moisture therefrom.

References Cited in the file of this patent

UNITED STATES PATENTS

| | | |
|---|---|---|
| 417,068 | Mond et al. | Dec. 10, 1889 |
| 1,453,655 | Berry | May 1, 1923 |
| 1,713,325 | Blake | May 14, 1929 |
| 1,834,115 | Williams | Dec. 1, 1931 |
| 2,050,305 | Frey et al. | Aug. 11, 1936 |
| 2,133,532 | Boegehold | Oct. 18, 1938 |
| 2,161,162 | Harsch | June 6, 1939 |
| 2,287,467 | Carpenter et al. | June 23, 1942 |
| 2,338,402 | Brandt | Jan. 4, 1944 |
| 2,603,578 | Ornitz | July 15, 1952 |
| 2,609,274 | Russum et al. | Sept. 2, 1952 |
| 2,759,799 | Berg | Aug. 21, 1956 |

FOREIGN PATENTS

| | | |
|---|---|---|
| 187,310 | Great Britain | Oct. 16, 1922 |

OTHER REFERENCES

Jenkins: Controlled Atmospheres For the Heat Treatment of Metals, 1946, pages 276–278. Published by Chapman and Hall, Ltd., London, England.